(12) United States Patent
Champredonde et al.

(10) Patent No.: US 9,169,527 B2
(45) Date of Patent: Oct. 27, 2015

(54) TREATMENT OF A HEATER TUBE INTENDED FOR A PRESSURIZER OF THE PRIMARY COOLING SYSTEM OF A NUCLEAR REACTOR

(75) Inventors: Jacques Champredonde, Antony (FR); Jean-Marie Fageon, Cergy (FR); Yves Neau, Montigny sur Loing (FR)

(73) Assignee: Electricite de France, Paris (FR)

(*) Notice: Subject to any disclaimer, the term of this patent is extended or adjusted under 35 U.S.C. 154(b) by 323 days.

(21) Appl. No.: 13/639,241

(22) PCT Filed: Apr. 6, 2011

(86) PCT No.: PCT/FR2011/050775
§ 371 (c)(1),
(2), (4) Date: Oct. 4, 2012

(87) PCT Pub. No.: WO2011/124846
PCT Pub. Date: Oct. 13, 2011

(65) Prior Publication Data
US 2013/0044852 A1 Feb. 21, 2013

(30) Foreign Application Priority Data
Apr. 8, 2010 (FR) ........................... 10 52651

(51) Int. Cl.
*G21C 19/20* (2006.01)
*G21C 17/017* (2006.01)
(Continued)

(52) U.S. Cl.
CPC .. *C21D 1/09* (2013.01); *C21D 1/10* (2013.01); *C21D 9/0068* (2013.01); *G21C 17/017* (2013.01); *H05B 3/42* (2013.01); *C21D 7/06* (2013.01); *C21D 2201/03* (2013.01); *G21C 1/09* (2013.01)

(58) Field of Classification Search
None
See application file for complete search history.

(56) References Cited

U.S. PATENT DOCUMENTS 4,718,949 A * 1/1988 Takase et al. ............... 148/672
5,437,747 A * 8/1995 Adamson et al. ........... 148/519
(Continued)

FOREIGN PATENT DOCUMENTS

FR 2 895 206 A1 6/2007
JP 2005-265449 A 9/2005

OTHER PUBLICATIONS

Rudnev, Valery, Induction Heating Serves Today's Forging Industry, p. 11-14, Forge, Nov. 2006, available at https://www.forging.org/system/files/field_document/Induction_Heating_Serves_Todays_Forging_Industry.pdf.*
Induction Heating Serves Today's Forging Industry, Valery Rudnev.*

*Primary Examiner* — Jack W Keith
*Assistant Examiner* — Sean P Burke
(74) *Attorney, Agent, or Firm* — Drinker Biddle & Reath LLP

(57) ABSTRACT

A treatment of a heater tube intended to be used in a pressurizer of the primary cooling system of a nuclear reactor. In particular, the heater tube comprises a heater housed in a substantially cylindrical sheath. The material of which this sheath is made is a work-hardened austenitic stainless steel. In particular, the external surface of the sheath is liable to undergo a stress corrosion during use of the heatertube. The method includes a heat treatment step, preferably using induction heating, in which the external surface of the sheath is heat-treated so as to recrystallize the material of the sheath at least on the surface thereof.

10 Claims, 4 Drawing Sheets

(51) Int. Cl.
*C21D 1/09* (2006.01)
*C21D 1/10* (2006.01)
*C21D 9/00* (2006.01)
*H05B 3/42* (2006.01)
*C21D 7/06* (2006.01)
*G21C 1/09* (2006.01)

(56) References Cited

U.S. PATENT DOCUMENTS 5,949,838 A * 9/1999 Alter et al. .................... 376/260
2008/0310578 A1* 12/2008 Steltzlen et al. .............. 376/416
2009/0141850 A1* 6/2009 Hoffmann .................... 376/307

* cited by examiner

TREATMENT OF A HEATER TUBE INTENDED FOR A PRESSURIZER OF THE PRIMARY COOLING SYSTEM OF A NUCLEAR REACTOR

CROSS-REFERENCE TO RELATED APPLICATIONS

This application is the U.S. national phase of the International Patent Application No. PCT/FR2011/050775 filed Apr. 6, 2011, which claims the benefit of French Application No. 1052651 filed Apr. 8, 2010, the entire content of which is incorporated herein by reference.

FIELD

The invention relates to the heater tubes for a pressurizer of a primary cooling system of a pressurized water nuclear reactor.

BACKGROUND

A heater tube, for such a pressurizer of a primary cooling system, normally comprises an outer metal casing that has an elongated cylindrical shape (for example 22 mm diameter by 2 m long approximately) called a "sheath", and a heater mounted inside the sheath.

Such tubes are mounted on a lower portion of the pressurizer, as explained in detail in document FR-2 895 206, and are submerged in the water of the primary cooling system that contains the pressurizer. They are used to raise the operating pressure of the primary cooling system. It will thus be understood that the tubes are under load when in use and undergo, in particular, thermal stress which, when combined with work-hardening stress as described below, potentially causes stress corrosion.

Incidents have shown that leaks could occur on the heater tubes of the state of the art. In particular, the sheath of a tube can crack, such that the inside of the tube is open to the water present in the pressurizer. There follows a possible deterioration of the heater of the tube, loss of operation of the tube, or even the leaking of the pressurized water to the outside of the pressurizer, through the inner space of the tube.

As a result, a solution is sought for limiting the risks of cracking of the sheath, due in particular to the stress corrosion that the sheath undergoes.

A solution was proposed in the above-mentioned document FR-2 895 206 that aimed to deposit a protective nickel coating onto the external surface of the sheath, using electrolysis. However, the solution of adding material leads to an alteration in the geometry of the tube, in particular by increasing the diameter thereof. Moreover, the solution is not completely secure, as the risk of removal of the nickel layer under the effect of impacts or friction cannot be ruled out. Given the increase in diameter, this solution cannot be used with heater tubes that are already manufactured, as they may no longer match the dimensions of the supports. Furthermore, it is lengthy to implement.

The present invention aims to improve the situation.

SUMMARY

To this end the invention proposes the treatment of the tubes with a view to reducing the above-mentioned cracking risks. The treatment provided in the context of the invention is, generally, the heat treatment of the tubes in order to recrystallize at least the external surface of the sheath.

Thus, the present invention relates to a method for the treatment of a heater tube intended for use in a pressurizer of the primary cooling system of a nuclear reactor. The heater tube includes a heater housed in a substantially cylindrical sheath. The sheath includes an external surface that is liable to undergo stress corrosion, at least partially, while the tube is in use.

In particular, as the sheath includes a steel-type material, for example of the work-hardened austenitic stainless steel type, the method in the context of the invention includes a heat treatment step of at least the external surface of the sheath, in order to recrystallize the material of the sheath, at least on the surface thereof.

The material thus recrystallized is not subject to the phenomenon of stress corrosion by comparison with the tubes of the state of the art, without deterioration, which eliminates the risks of cracking and ultimately extends the life of the tube.

Preferably, the heat treatment uses induction heating applied starting from the external surface of the sheath.

In particular, a heat treatment is envisaged that includes a rise in temperature on the external surface of the sheath comprised within a range of 800° C. to 1,100° C. and preferably between 900° C. and 1,050° C. or between 950° C. and 1,050° C., for example 960° C., 970° C. or even 1,000° C.

By applying a heat treatment using induction heating, the rise in temperature of the heater resulting from the heat treatment is advantageously limited to a maximum value of 900° C., allowing the electrical resistance and isolation properties of the heater to be retained.

In an embodiment described in detail hereinafter, the heat treatment using induction heating consists of applying an alternating current in the windings of an inductance coil surrounding the external surface of the sheath. The frequency of the alternating current can be chosen and is preferably at least 100 kHz. The higher the frequency, the more the energy transmitted to the sheath using induction heating is concentrated on a small thickness of the sheath according to a so-called "skin" effect. Said frequency value is given in a context where the induction winding has a diameter of 30 to 50 mm and for a sheath the diameter of which is of the order of 20 to 25 mm.

The inductor is arranged around the tube and, in particular, a relative displacement of the inductor with respect to the tube is preferably applied, at least in translation along the tube.

In one embodiment, the speed of the translational displacement is comprised between 100 and 900 mm per minute, for a power supplied by induction comprised between 1 and 50 kW.

Preferably, the inductor is of the solenoid type.

In one embodiment, a supply of inert gas can moreover be provided onto the external surface of the sheath in order to avoid oxidation following the heat treatment.

After the heat treatment, it is also possible to apply cooling by blowing a fluid (for example air) onto the external surface of the sheath.

The present invention also relates to a heater tube, as such, obtained by the method in the context of the invention. In particular, the sheath of the tube includes at least on its external surface a thickness of recrystallized material. The thickness is preferably greater than or of the order of 1 mm. The thickness is advantageously comprised between approximately 1 mm and a total thickness of the sheath of the tube, and more particularly comprised between approximately 1.5 mm and approximately 3 mm, for example approximately 2 mm.

By "recrystallized material" is meant the fact that the heat treatment applied contributes to regenerating severely deformed grains having high hardness, into grains with equal axes having high or medium hardness. Thus, a trace of the method of the invention on the tube consists in that the hardness of the sheath on its external surface is lower than for a standard tube of the state of the art. Typically, a hardness equivalent to a value less than or equal to approximately 240 Vickers or even less than approximately 200 Vickers can be measured on the external surface of the sheath of a treated tube in the context of the invention. These hardness values represent respectively recrystallized material thicknesses greater than or of the order of 1 mm or approximately 1.5 mm to 2 mm.

As explained hereinafter, initially, the heater is mounted in the sheath of the tube by crimping, the external surface of the sheath being swaged. Work-hardening of the external surface of the sheath results. As will be seen hereinafter, there is a synergic effect between the work-hardening and the heat treatment in the context of the invention.

It is then possible to observe on a tube, before the heat treatment in the context of the invention, traces of work-hardening by swaging, in particular on the external surface of the sheath. Advantageously, the consequences of the work-hardening (in particular in terms of stress corrosion resistance) disappear overall after the treatment of the invention.

Thus, the heat treatment chosen in the context of the invention is preferably a treatment using induction heating, aiming to promote recrystallization of the material from which the sheath is made, in particular on the external surface of the sheath. By way of non-limitative example, the material of the sheath can typically be an austenitic steel (containing essentially iron, 16 to 20% chrome and 8 to 14% nickel, as well as carbon (less than 1%) and optionally molybdenum, niobium or titanium).

It has in fact been observed that the risk of corrosion of the sheath of a tube can be linked to its method of manufacture by swaging, causing the substantial work-hardening of the metal, in particular on the external surface of the sheath. FIG. 3 represents an enlarged view of the surface SUR of the sheath of a tube, showing in particular very work-hardened grains close to the external surface SUR of the sheath.

For this first reason, heat treatment using induction heating is advantageous since, in principle, firstly it promotes a rise in temperature in particular on the external surface of the material treated using induction heating.

Treatment using induction heating is also advantageous at least for a second reason: it is suspected that overall heat treatment (at approximately 1,050° C. for recrystallizing the sheath of a tube) might cause deterioration of the electrical properties of the tube and in particular of the heater mounted inside the sheath. As a result, surface heat treatment of the tube only, and in particular of the sheath, selectively, is preferred in one embodiment of the invention. Heat treatment using induction heating is therefore suitable. When the temperature of the heater is above 900° C., it is in fact suspected that deterioration of the electrical properties may occur.

Thus, treatment using induction heating, advantageously of the surface of the sheath, makes it possible to improve the morphological defects (significant plasticization, dislocations and local stresses) on the surface of the sheath, linked in particular to the work-hardening of the sheath during the manufacture of the tube.

Moreover, when the heat treatment is carried out by means of a solenoid surrounding the tube, the recrystallization heat treatment can be implemented without creating any heat treatment discontinuities.

Axially, continuous and regular heat treatment can be obtained by continuous and regular displacement of the tube in the inductor, or vice-versa.

Radially, heat treatment takes place simultaneously over the whole circumference of the sheath with substantially equal intensity. The risks of forming radial stress non-uniformity during the recrystallization treatment are therefore low.

In particular, the stresses due to the work-hardening of the sheath during manufacture of the tube are absorbed uniformly over the circumference of the tube.

Stress non-uniformity could occur if, during the surface heat treatment, certain areas of the sheath that are more significantly work-hardened undergo recrystallization treatment to a lesser extent than other areas of the tube sheath that are less significantly work-hardened. Radial stress non-uniformity creates areas of high stress on one side of the tube and areas of low stress on another side of the tube, which could contribute to bending the tube.

Moreover, the energy (therefore the temperature) required for recrystallizing a work-hardened steel is less than for a steel that is not work-hardened. For example, while a non work-hardened steel starts recrystallization at 1,050° C., the same steel superficially work-hardened needs only a smaller rise in temperature, for example 960° C., considering moreover that not all of the surface of said steel is work-hardened and that the work-hardening is not homogeneous over the whole thickness of the sheath. This observation makes it possible to reduce the temperature to be applied to the sheath for its recrystallization and therefore also to reduce the temperature that the heater must undergo inside the sheath.

Use of a surface temperature comprised between 900° C. and 1,050° C. or more particularly between 950° C. and 1,050° C., for example 960° C., 970° C. or even 1,000° C. makes it possible to ensure surface recrystallization when the surface of the sheath includes areas that are less significantly work-hardened than other areas. In particular, these surface temperatures make it possible to recrystallize portions of the sheath that are less work-hardened than the external surface, for example areas closer to the centre.

As mentioned previously, there is a synergic effect between the work-hardening and the heat treatment in the context of the invention. In particular, the work-hardening initially present makes it possible to reduce the temperature of the treatment. Moreover, the treatment according to the invention makes it possible to overcome defects from the manufacturing of the tubes by work-hardening. The heat treatment according to the invention allows the majority of the stresses present in the sheath to be absorbed, including residual stresses caused by the work-hardening and present deep within the sheath, below the external surface.

When the recrystallization treatment is carried out over a thickness of the order of those mentioned above, in particular approximately 1.5 mm or approximately 2 mm, the majority of the thickness of the sheath is treated. The majority of the stresses induced in the sheath by work-hardening during the manufacture of the tube are then absorbed. The external surface of the sheath thus undergoes only minimal stress on the part of layers that are further inside the sheath.

By absorbing the stresses due to the work-hardening of the sheath, the method according to the invention makes it possible to reduce the stresses that are present overall in the tube to values less than approximately 100 MPa, or even less than approximately 80 MPa. Thus, the stresses present overall in the tube are markedly less than the limit stresses above which stress corrosion can take place in use, i.e. for tubes having a sheath made from austenitic steels, stresses of the order of 300 MPa to 400 MPa.

BRIEF DESCRIPTION OF THE DRAWINGS

Other features and advantages of the invention will become apparent on reading the detailed description below of non-limitative examples, as well as examining the attached drawings in which.

DETAILED DESCRIPTION

Figure 1:
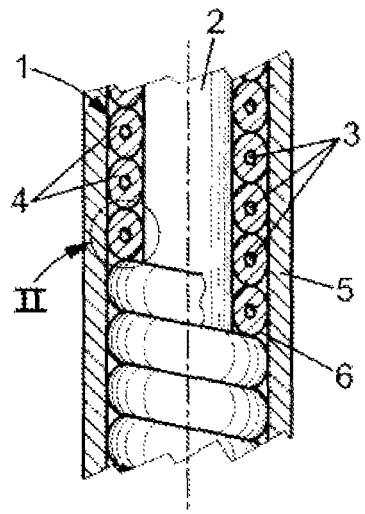
FIG. 1 shows a cross-sectional view of a tube, showing in particular the inside of a tube in the context of the invention.

Firstly, reference is made to FIG. 1, in which the portion of the tube intended to be submerged in a pressurizer is shown. In this case, it includes a cylindrical-shaped sheath 5 made from stainless steel. It will thus be understood that the method can be applied to any tube the sheath of which is produced from the general family of "stainless steels" (without particular limitation of the proportion of alloys forming said steel).

The central core of the tube includes a mandrel 2, usually made from copper, inside the sheath 5, along the central axis of the sheath, as well as a heating wire 1 coiled around the mandrel 2 in a spiral and interposed between the mandrel 2 and the sheath 5. The heating wire constitutes the heater mentioned above in the general presentation of the invention.

The heating wire 1 comprises an electrically conductive resistive metal core 3, for example made from copper or nickel-chrome alloy. A protective metal coating made from steel 6 (see in particular the detail in FIG. 2) surrounds the core 3. The coating 6 is electrically isolated from the core 3 by an insulator 4 for example magnesia (MgO). The heating wire 1, wound around the mandrel 2 forming contiguous turns, is intended to be connected to a connector electrically connected to an electricity generator making an electric current flow in the conductor wire 1. Details on the connection of such a heater tube and its use in the primary cooling system of a nuclear reactor are described in publication FR-2 895 206.

Figure 2:
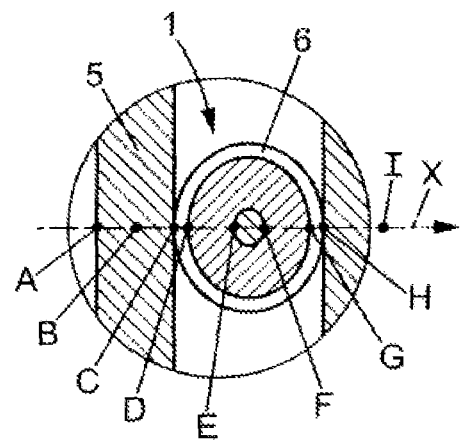
FIG. 2 shows a detail of FIG. 1, with in particular different points at which the temperature associated with the treatment using induction heating is estimated according to the graphs in FIGS. 4 and 5.
Figure 3:
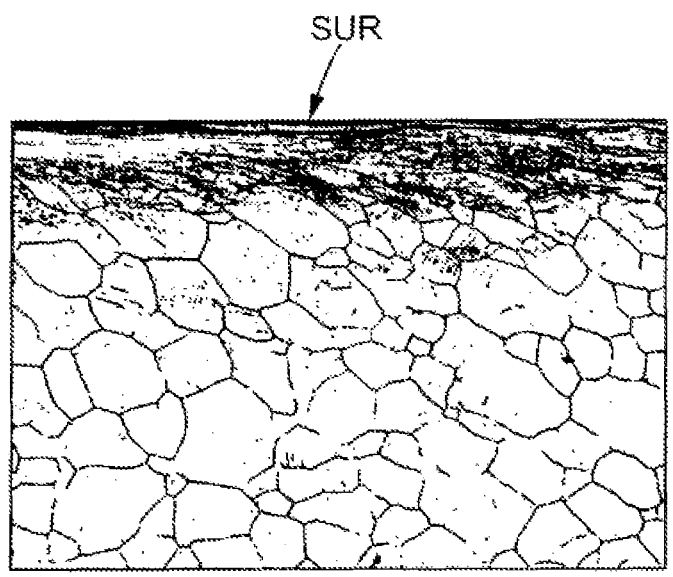
FIG. 3 shows a microscopic view of the surface of the sheath of a tube.

Referring now to FIG. 2, the thickness of the sheath 5 (between points A and C), in an embodiment that is in no way limitative, is 2.45 mm. The thickness of the protective coating 6 of the heating wire 1 is 0.5 mm (between points C and D in FIG. 2). The thickness of the magnesia lining 4 is 0.4 mm (between points D and E in FIG. 2). Thus it will be understood that the representation in FIGS. 1 and 2 is not necessarily to scale. Finally, the diameter of the conductive core 3 of the heating wire is approximately 1.5 mm (between points E and F).

Furthermore, the elements surrounded by the sheath 5 are crimped into the sheath according to a step of shrinking the sheath by swaging, which moreover generates the mechanical stress that is liable to affect the stress corrosion resistance. After shrinking, the sheath 5 is in close contact with the coils 1 of the heating element, as shown in particular in FIG. 2.

Figure 4:
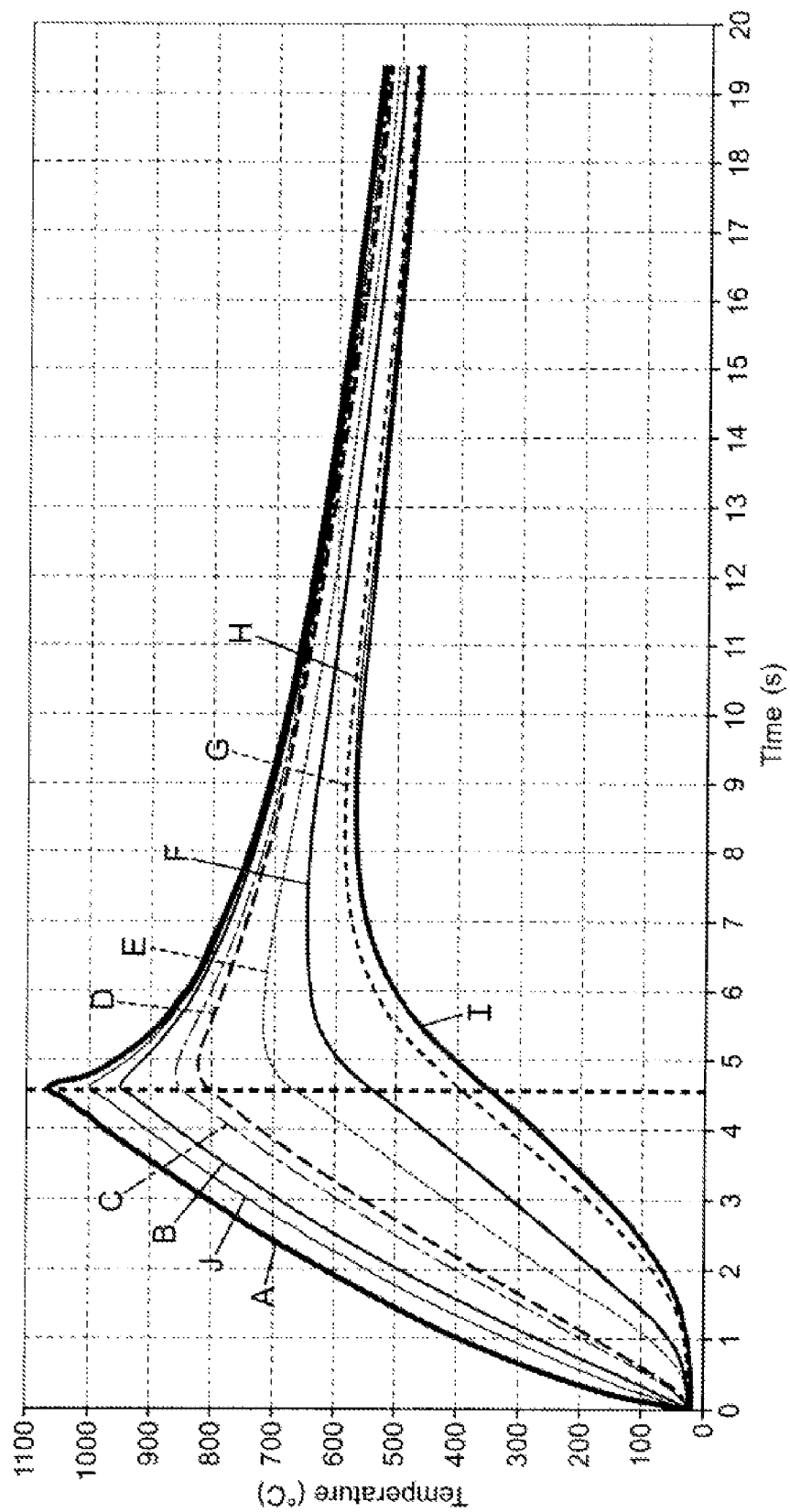
FIG. 4 is a graph showing estimated temperature profiles according to time at different points of the tube, the detail of which is shown in FIG. 2, under conditions of treatment using induction heating at a frequency of 300 kHz, with a double-coil 2,000-ampere inductor and stopping heating at 4.6 seconds, not maintained.

According to a first series of tests carried out, a rise in temperature of the external surface of the sheath 5 of approximately 1,050° C. was sought, for the purpose of its recrystallization. With reference to FIG. 4, it was estimated that the external surface of the sheath (curve A) exhibited a temperature rise peak of 1,050° C., promoting recrystallization. At point J, corresponding to approximately 83% of the power received by induction ("skin effect" known in treatment using induction heating), the rise in temperature is approximately 1,000° C. In particular, curve B shows the temperature profile at 1.5 mm from the external surface of the sheath (at point B in FIG. 2). It became apparent that a rise in temperature to only 900° C. already allowed recrystallization of the material of the sheath. Thus, said first series of tests made it possible to recrystallize practically the whole of the sheath, including its volume. It will be observed however, on the curve marked E, that the temperature of the core 3 of the heating wire does not exceed 800° C., making it possible to retain the conductive properties of the core 3 of the heating wire, thus ensuring that the treatment in the context of the invention does not produce any deterioration of the content of the tube. Overall, a rise in temperature of the external surface of the sheath is sought within a range of 800° C. to 1,100° C., and preferably 900° C. to 1,050° C., a temperature range sufficient to recrystallize the material of the sheath. To said constraint is added a maximum rise in temperature of the magnesia 4 that is limited to 850° C. (at point D in FIG. 2), in order to ensure a smaller rise in temperature of the core 3 of the heating wire.

Figure 6:
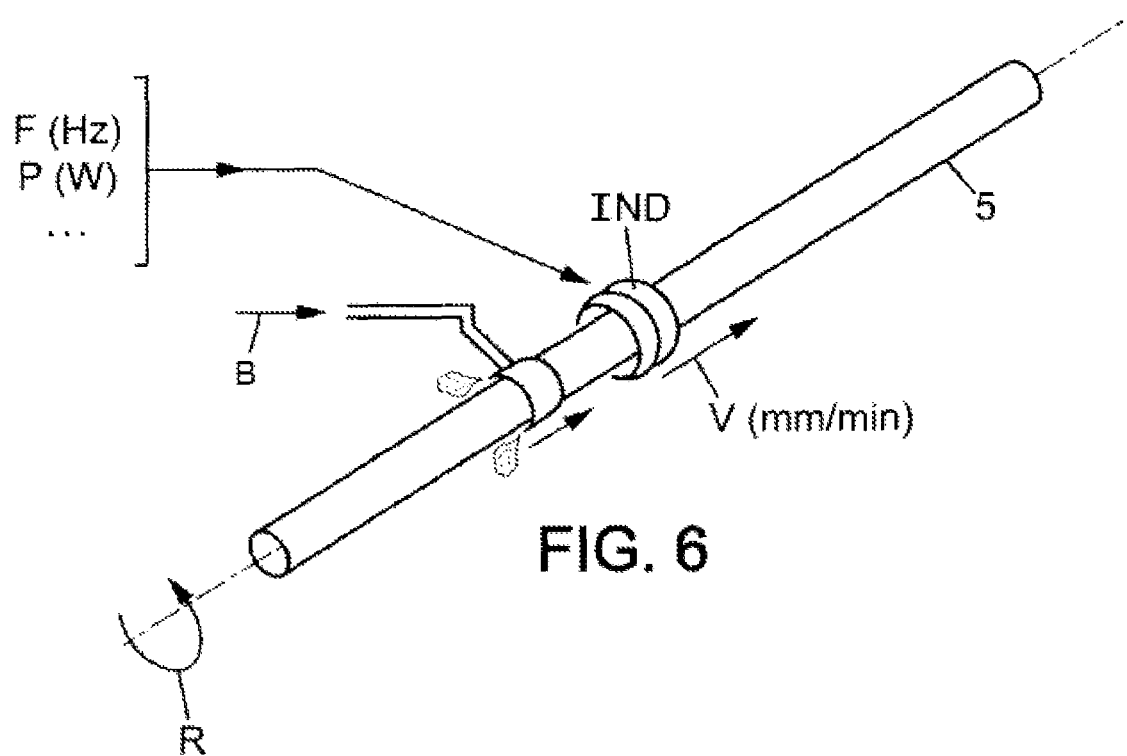
FIG. 6 gives a very diagrammatic representation of an installation for implementing the method.

In order to respect these constraints, advantageously a set of induction parameters is chosen from at least:
- the frequency f(Hz) of the alternating current flowing in the coils of the inductor (reference IND in FIG. 6), it being understood that the higher said frequency, the more the energy received by induction is confined to the surface of the sheath 5 (by skin effect),
- the power P (W) or as an equivalent the amperage of the current for the chosen frequency,
- the duration of application of the heat treatment, shown in the example in FIG. 6 by a speed V (mm/min) of relative displacement of the inductor IND with respect to the sheath 5 of the tube.

Of course, the lower the speed of the inductor with respect to the tube, the greater the rise in temperature.

Figure 5:
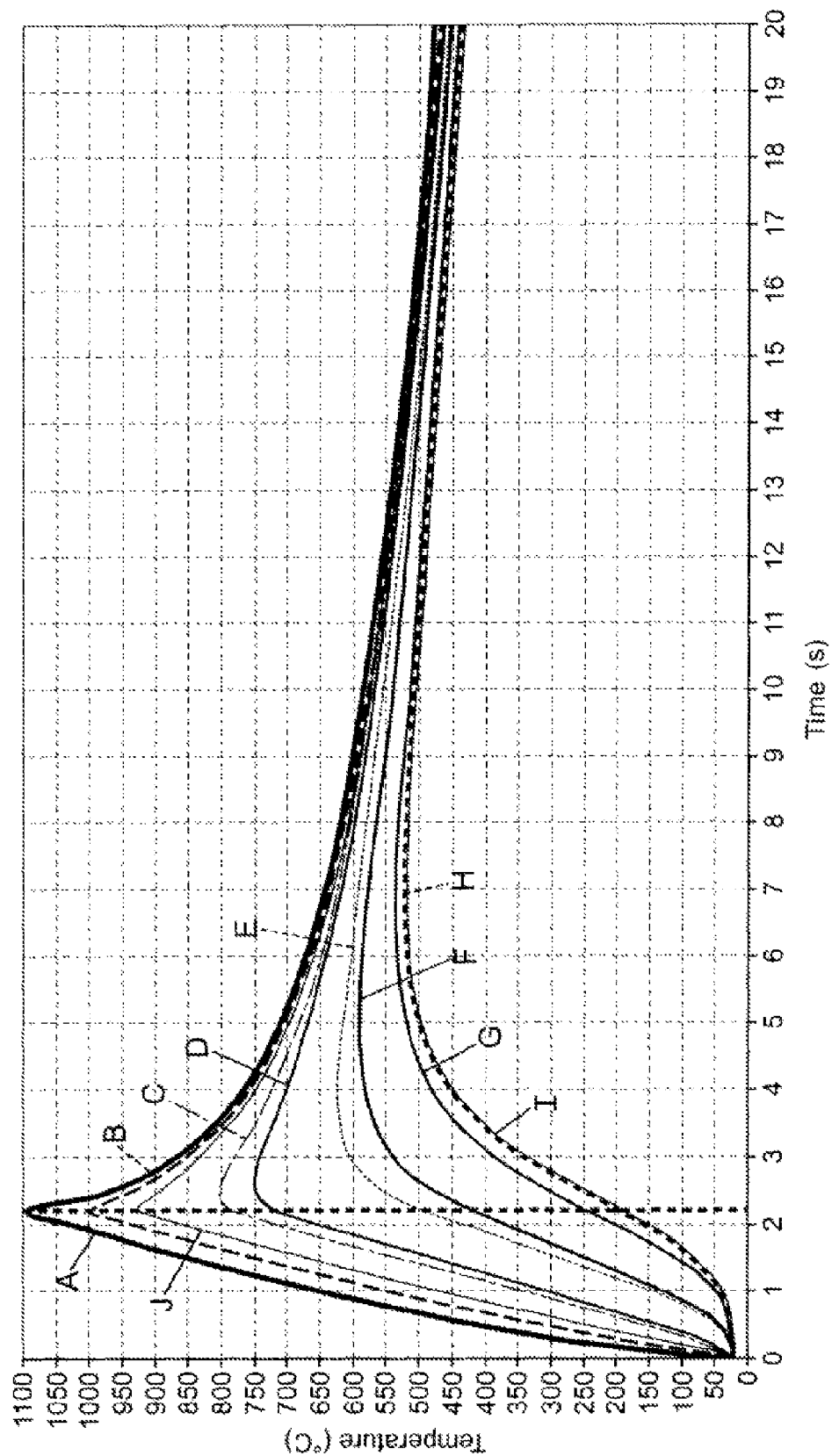
FIG. 5 is a graph showing estimated temperature profiles at different points of the tube, the detail of which is shown in FIG. 2, under conditions of treatment using induction heating at a frequency of 200 kHz, with a double-coil 3,000-ampere inductor, not maintained.

These different effects are thus shown in FIG. 5, which represents an estimate of the temperature rises for a higher speed of travel, but with a higher power density. It will be noted here that the interface between the protective coating of the heating wire and the magnesia (point D) undergoes a rise in temperature of less than 750° C.

According to the set of tests carried out, it transpires that the frequency of the alternating current to be provided is preferably greater than 150 kHz, so as to protect the magnesia 4 and/or the conductive core 3 of the heating wire 1, while limiting the rise in temperature to a threshold value of the order of 800 to 900° C. The power supplied can be within a range of 1 to 50 kW. The relative speed of movement of the inductor IND with respect to the tube can be comprised within a range of 100 to 900 mm/min. Under these conditions, it is preferable to provide a solenoid inductor having an inside diameter of 30 to 50 mm, it being understood that the diameter of the tube, in a given embodiment, is 22 mm.

Preferably, as shown in FIG. 6, the tube is rotated during heat treatment (arrow R) about its central axis, in order to homogenize the heat treatment applied to the sheath.

Of course, the parameters of the treatment using induction heating such as, in particular, the frequency, the power and the speed of travel are adjustable in the treatment installation shown in FIG. 6 according to the precise dimensions of the elements constituting the tube, according to their material, or other constraints. It will be understood generally that the effect sought in the treatment using induction heating is to create an alternating magnetic field (using alternating currents flowing in the inductor) in order to generate induced currents on the external surface of the sheath of the tube. Said induced currents instantly heat the area where they occur. On the other hand, the inner elements of the tube such as the inner surface of the sheath, and in particular the heating wire 1 and the mandrel 2 are, in principle, only heated by thermal conduction (as clearly shown by curves E to I in FIGS. 4 and 5). It will thus be understood that the treatment thickness is ultimately a function of the chosen frequency value (for the skin effect) and of the treatment time, or in an equivalent manner, of the speed of travel of the inductor with respect to the tube (by thermal conduction).

Recrystallization of at least the external surface of the sheath 5 of the tube then occurs. The recrystallization is seen in particular by the fact that the material becomes softer when recrystallized. Typically it is possible to measure a hardness of less than or equal to approximately 240 Vickers by a penetration measurement using a conical diamond at a pressure of 5 kg on the external surface of the sheath 5 of a tube treated using the method in the context of the invention. The thickness of the recrystallized sheath is at least 1 mm.

Thus it will be understood that tracing the method in the context of the invention on the treated tube consists of measuring a hardness less than or equal to approximately 240 Vickers, for example over at least 1 mm thickness from the external surface of the sheath 5 of the tube.

FIG. 6 shows the blowing B of a fluid onto the tube, immediately after the treatment using induction heating. Indeed a cooling effect can be provided (for example by air) in order to reduce the temperature of the elements constituting the tube, after recrystallization of the sheath. In this way the temperature is reduced at the ends of the curve, as shown in FIGS. 4 and 5.

The tube can also be protected from oxidation (after rise in temperature) by installing a muffle (quartz sleeve around the tube) for supplying an inert gas (for example argon, helium or possibly nitrogen). Said muffle supplying an inert gas (not shown in FIG. 6) can operate between the inductor IND and the air blower B in the diagram shown.

In a variant, the heat treatment can be carried out in a cabinet under an inert gas atmosphere in order to avoid superficial oxidation of the sheath.

More generally, the present invention is not restricted to the embodiments given above; it extends to other variants.

Thus, the air blower B shown in FIG. 6 for cooling the tube can simply be removed.

Moreover, the application of inert gas onto the sheath is also optional. Due to the short duration of treatment, the possible oxidation of the tube remains limited. At most, a slight blueing of the external surface of the sheath 5 is noted. Said oxidation can simply be removed by a final pickling step (a step already planned and implemented in the general manufacturing method of the tubes). During said pickling step, the thin oxidation layer formed by the treatment using induction heating is removed, making it possible to avoid providing for the blowing of inert gas or applying the heat treatment in an inert gas chamber such as described above.

Moreover, as stated above, the temperature rise values given in the examples in FIGS. 4 and 5 allow numerous variants. Generally, it can be assumed that as the recrystallization of the sheath can take place between 800 and 1100° C., the conditions of treatment using induction heating aim to raise the temperature of the external surface of the sheath accordingly, while seeking to limit the rise in temperature of the heating wire to approximately 900° C. at most. Moreover, it is also preferable that the rise in temperature of the external surface of the sheath does not exceed a threshold value, for example above 1,100° C., or that the duration of the heat treatment is also limited to a threshold value, in order not to promote so-called "secondary recrystallization" which is seen overall through a lack of homogeneity in the size of the crystalline grains, weakening the material.

Moreover, as explained above, if the external surface of the sheath is work-hardened overall, the maximum temperature rise at the surface of the sheath (peak of curve A of FIG. 4 or 5) can be reduced below 1000° C., for example to 960° C.

More generally, heat treatment using induction heating has been described above by way of example, but the invention can be applied to any type of heat treatment capable of selectively restricting the rise in temperature mainly to the sheath of the tube. For example, heating by laser scanning or by annular torch on the surface of the sheath can be envisaged. The treatment by annular torch, reproducing heat treatment having similar advantages to those of treatment by a cylindrical solenoid, is particularly advantageous.

The invention claimed is:

1. A method for the treatment of a heating rod intended to be used in a pressurizer of the primary cooling system of a nuclear reactor, said heating rod comprising:
    a substantially cylindrical sheath having an external surface that is liable to undergo stress corrosion, at least partially, during the use of the heating rod, said sheath including a work-hardened austenitic stainless steel material,
    a mandrel housed inside said sheath, and
    a heating device housed inside said sheath, said heating device comprising a heating wire coiled around said mandrel and in contact with said sheath,
    wherein the method comprises a heat treatment step of at least the external surface of said sheath of said heating rod, said heat treatment step including a rise in temperature of the external surface of the sheath to a temperature in a range from 900° C. to 1050° C. to recrystallize the material of the sheath, the heat treatment being implemented using a solenoid inductor coil external to the heating rod and surrounding the substantially cylindrical sheath, and wherein the rise in temperature of the heater resulting from the heat treatment is limited to a maximum value of 850° C.

2. The method according to claim 1, wherein an inductor coil having a diameter is used and an alternating current frequency applied in the inductor coil for recrystallization treatment using induction heating is at least 100 kHz, for a coil 30 to 50 mm in diameter surrounding the external surface of the sheath, the diameter of the sheath being of the order of 20 to 25 mm.

3. The method according to claim 1, wherein an inductor is arranged around the substantially cylindrical sheath, and a relative displacement of the inductor with respect to the substantially cylindrical sheath is applied, at least in translation along the substantially cylindrical sheath.

4. The method according to claim 3, wherein a speed of the relative displacement in translation along the substantially cylindrical sheath is between 100 and 900 mm per minute, for a power supplied by induction between 1 and 50 kW.

5. The method according to claim 1, further comprising a supply of inert gas onto the external surface of the sheath in order to avoid oxidation following the heat treatment.

6. The method according to claim 1, further comprising, after the heat treatment, a step of cooling by blowing fluid onto the external surface of the sheath.

7. The method according to claim 1, wherein the external surface of the sheath has at least traces of work-hardening before the heat treatment step.

8. A heating rod produced by the method according to claim 1, wherein the sheath of the tube includes at least on its external surface a thickness of recrystallized material.

9. The heating rod according to claim 8, wherein the thickness of the sheath is greater than or of the order of 1 mm.

10. The heating rod according to claim 8, wherein the sheath has a hardness equivalent to a value less than or equal to approximately 240 Vickers.

* * * * *